Figure 7:
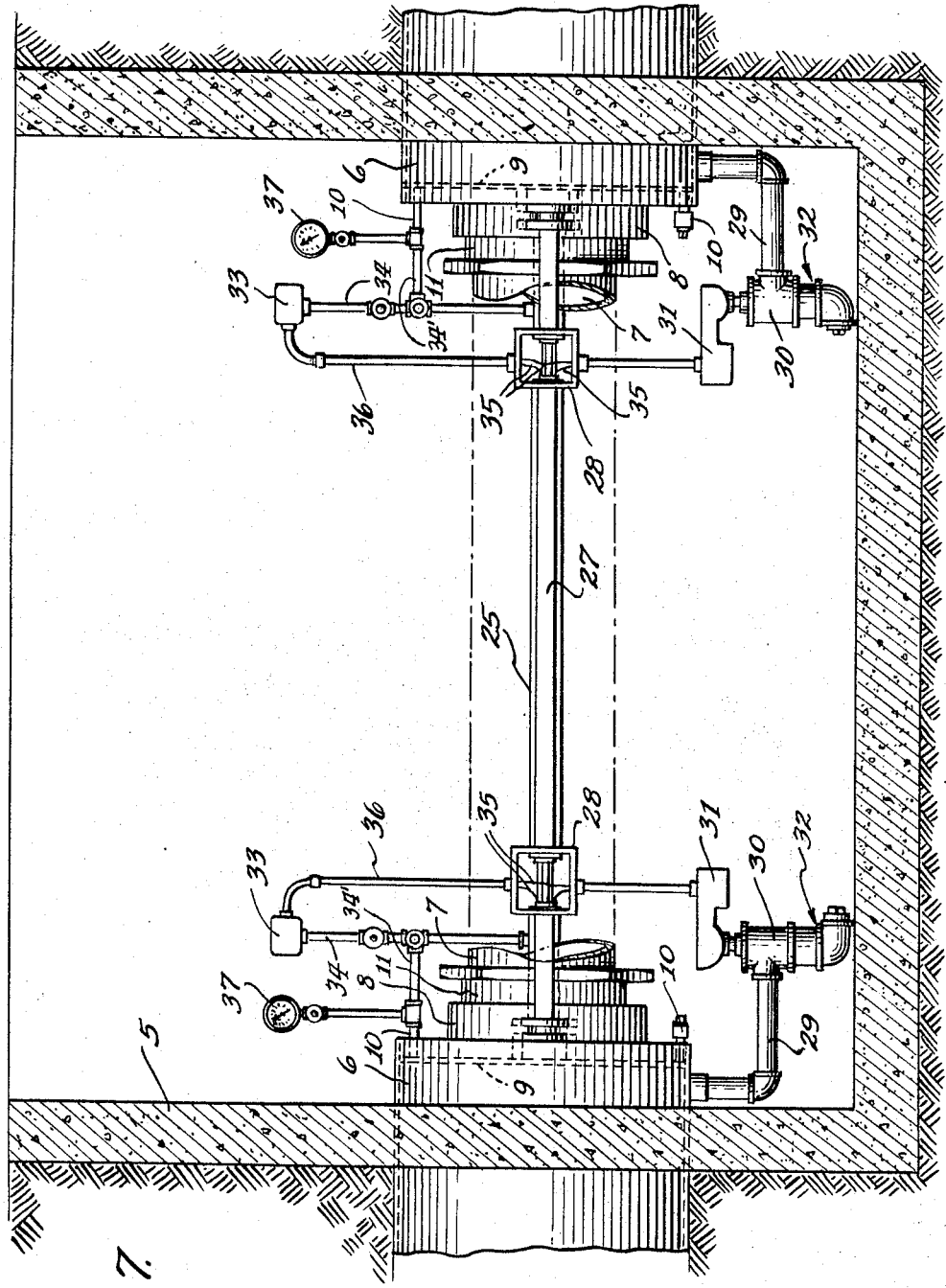

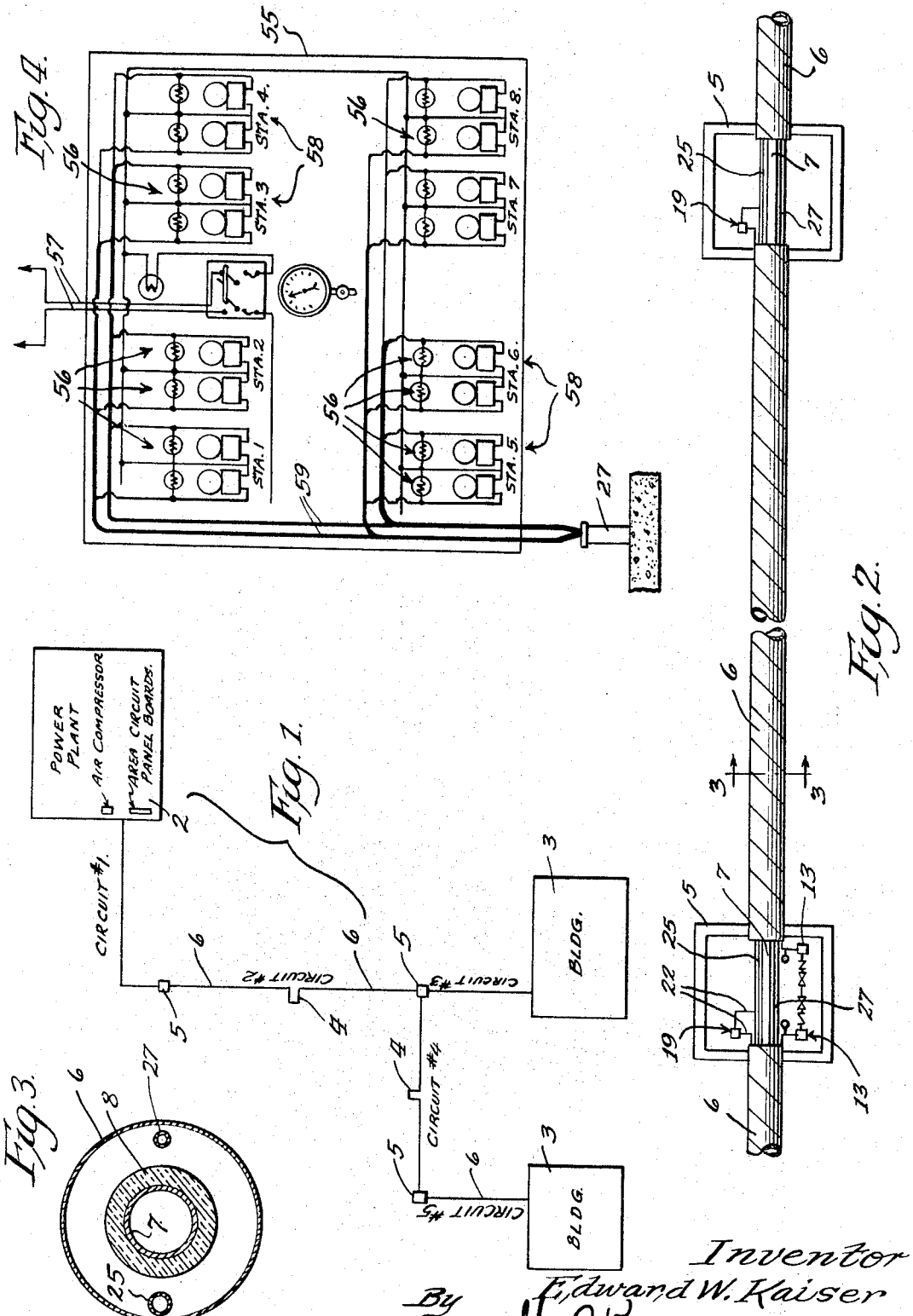

Aug. 15, 1967  E. W. KAISER  3,336,584
TELL-TALE SYSTEM FOR JACKETED PIPING SYSTEMS
Filed July 2, 1964  4 Sheets-Sheet 2
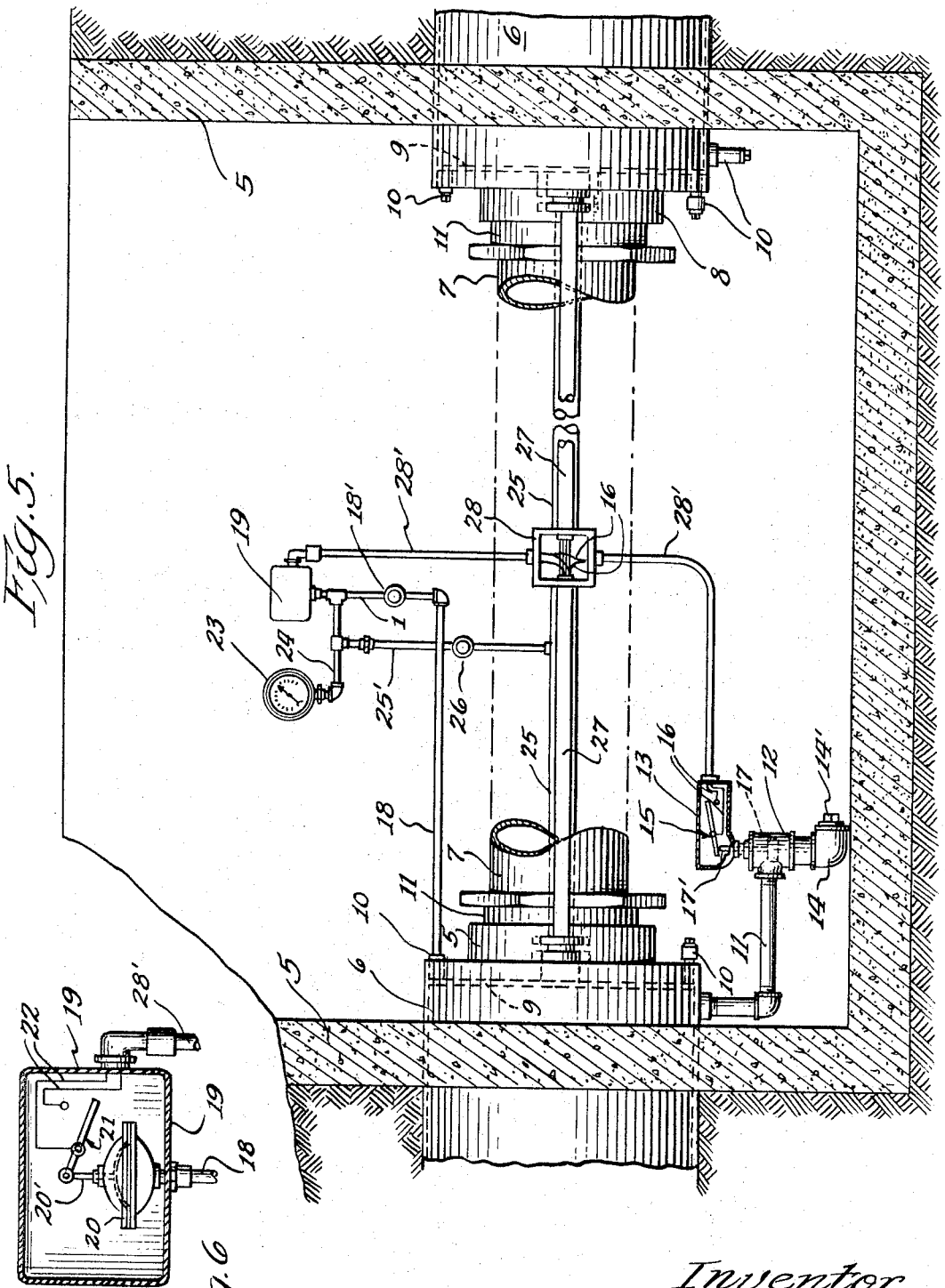
Inventor
Edward W. Kaiser
By W. F. Kellogg
Atty.

Inventor
Edward W. Kaiser
By W. F. Kellogg
Atty.

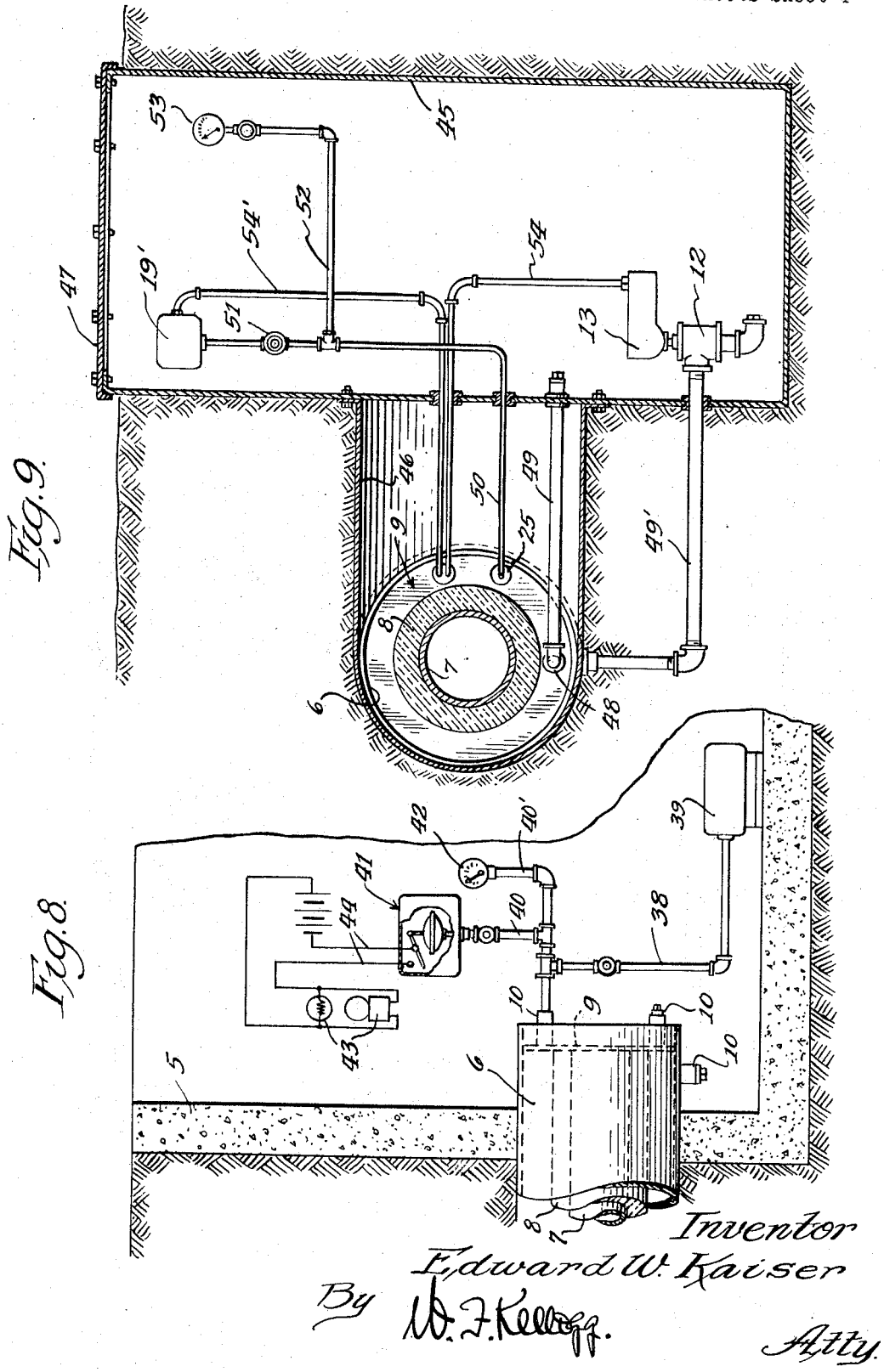

United States Patent Office 3,336,584
Patented Aug. 15, 1967

3,336,584
TELL-TALE SYSTEM FOR JACKETED PIPING SYSTEMS
Edward W. Kaiser, 2011 W. Arthur, Chicago, Ill. 60645
Filed July 2, 1964, Ser. No. 379,990
4 Claims. (Cl. 340—242)

This invention relates to improvements in so-called jacketed piping systems, that is, pipe systems wherein single or multiple conduits or pipes are received and supported within protective jackets or casings such as described and claimed in my United States Letters Patents numbered 2,658,527 and 2,680,901, more particularly, to an alarm system therefor whereby operational defects or faults as may occur within the conduits or pipes and/or jacket or casing will be signalled to a "watch attendant" in a manner that will permit localizing (spot locating) of the existing difficulty and its correction in a minimum of time and with a minimum of labor.

In piping systems, especially those of the encased or jacketed multiple or single conduit lines, it is both beneficial and useful, if not imperative, that fluids, viscous, or other matters flowed and flowing through the encased or jacketed conduits shall be constantly and faithfully maintained at predetermined pressures and/or temperatures lest their point to point transmission shall be retarded and/or otherwise detrimentally affected as by leaks therein, or leaks at their jointures; moreover, that the casing or jacket receiving and housing said conduit shall be at all times impervious to external or internal leakage (fluid tight) as by breakage, puncturing, faulty joint connections, or other and many varied structural difficulties.

Whereas operational and structural standards of perfection, as above stated, are ideal and sought, their satisfactory and enduring characters are difficult of prolonged attainment due to unforeseen conditions, contingencies, structural fatigue and possible faulty workmanship.

With the above in mind, it is the principal object of my invention to provide to a jacketed conduit and/or piping system an assembly of instrumentalities (a means) which when operationally installed therein will constantly and reliably function as a tell-tale of or with respect to any and all performance and structural failures occurring within said system; moreover, will spot locate such failures, thereby permitting repair, replacement or other corrective work to be effected in and with a minimum of time, labor and loss.

Another object of my invention is to provide a tell-tale system of the stated character installable in those types of jacketed conduit lines or systems including single or multiple conduits or pipes received and supported within and extending through a jacket or casing in spaced relation to its walls, thereby effecting a continuous overall way between the same through which a pressure measured and maintained fluid medium, such as air or other gases or liquids, are flowed, and in the event of its reduction in pressure as by leakage through faults, fractures, or other defects occurring in said jacket or casing, will be spot announced or indicated as to its or their location, thus facilitating the required repairs or replacements.

By the same token, it is an object of my invention to provide a fault locating tell-tale system for jacketed piping systems by means of which defects, fractures and/or the like occurring in the inner and jacket or casing received and supported conduit or pipe, permitting leakage of the flow load therein, will be spot announced or indicated as to its location, again facilitating the required remedying thereof in the shortest possible time period and with a minimum of labor and operational loss.

A further object of the invention resides in the provision of a system of the indicated kind in which the alarm effecting devices or means thereof will be both audible and visual.

Yet another object of the invention is to provide a piping system defect tell-tale alarm and spot locating instrumentality assemblage which may be installed and contained in such system without incurring detriment to its peak operational efficiency and which will be, and remain, dependably performance effective whether above ground, underground, or submerged.

Generally stated, it is an object of my invention to provide to a jacketed or encased piping installation a tell-tale system which will improve and assure its constant and enduring satisfactory functioning or performance with a minimum of maintenance expense and with a maximum of operational safety, one which will automatically indicate on an appropriately located signal panel the condition of any and/or all parts and sections of said installation, this in contradistinction to the heretofore long established though satisfactory and costly practice of man effected "line walking" inspection.

The foregoing, as well as other objects, advantages and meritorious teachings of my invention, will be in part obvious and in part pointed out in the following detailed disclosure thereof, when taken in conjunction with the accompanying drawings, it being understood that the forms of invention presented herein are precise and what are now considered to be the better modes of embodying its principles, but that other and further modifications and changes may be made in specific embodiment without departing from its essential features.

In the drawings:

FIGURE 1 is a diagrammatic view illustrating a conduit or piping installation of the jacketed type in which my invention is installed, FIGURE 2 is a top view of a "run" or sections of pipe casing or jacket with pipes therein entered into and communicating with spaced manholes in which pressure and float actuated electric switches are received and supported.

FIGURE 3 is an enlarged transverse section taken on a line 3—3 of FIGURE 2, looking in the direction in which the arrows point, FIGURE 4 is a schematic view of the audible and visual signal control for tell-tale board preferably located in the system power plant building, FIGURE 5 is a vertical longitudinal section through a manhole receiving the casing or jacket ends, the conduits or pipes housed and supported thereby, the float and pressure actuated electrical switches operable as and when leaks or pressure losses occur within the jackets or pipes, and fluid pressure gauge, FIGURE 6 is a detail in vertical section through the casing receiving the fluid pressure actuated electrical switch for detecting any and all prohibitive loss of air pressure within a communicating jacketed pipe line, FIGURE 7 is a view similar to FIGURE 5, but wherein the jacketed pipe lines entered into the illustrated manhole are each equipped with float and fluid pressure actuated electrical switches and fluid pressure gauges, FIGURE 8 is a fragmentary vertical longitudinal section through a manhole into which a pipe casing or jacket is entered and provided with an air or fluid pressure operated electrical switch connected to and controlling operation of audible and visual signals local to or contained within the manhole, plus a compressed air or other fluid supply connected to the casing, and FIGURE 9 is a vertical section through a multi-compartmented tank-like type manhole, one compartment of which receives an end of a pipe housing casing or jacket, and the other end receives the leak detecting pressure and float actuated electrical switches and air pressure gauge.

Referring in detail to the drawings, particularly to the FIGURES 1 through 6, a typical system in which my alarm system is installable and advantageously operative is shown in the FIGURE 1. Therein, jacketed conduit or pipelines 1 are extended or "run" underground from a central power plant 2 into one or more buildings 3, said lines being identified as Circuits 1, 2, 3, 4 and 5. Expansion joints 4 are interposed in the pipe circuits when their length so requires, and the line or pipe circuits are provided with relatively spaced manholes 5.

The jacketed conduit or pipelines 1 are constructed in accordance with my United States Patents numbered 2,658,527 and 2,680,901, generally consisting of casings or jackets 6 receiving and slidably supporting therein one or more pipes, such as indicated at 7, surrounded or covered by a form sustaining insulating material 8. The pipe or pipes 7 are supported in spaced relation to the casings or jackets, hence, a continuous flow-way is provided about and along the same, as shown in FIGURE 3. As is usual, end seal plates 9 are engaged in those ends of the casings or jackets entered into the manholes 5, being secured by welding or other suitable means, to adjacent portions of the casings and pipes and provided with nipple connections or fittings 10. Also, packing glands 11 may, and preferably are, engaged over and about a single pipe shown in FIGURE 5, closing or sealing the space between it and its insulation 8.

In FIGURE 5 of the drawings I have shown the manhole entered end of but one of the jacketed pipelines provided with leakage and pressure loss or reduction detecting and tell-tale means.

The leakage detecting means structurally includes an angular drain pipe 11 tapped into the lower portion of the manhole entered end of the jacket, connected at its remaining end to a float chamber fitting 12 fixedly supporting an electrical switch housing 13 and a mud or silt drain 14 normally closed by a screw-plug 14'. An electrical switch, generally indicated at 15, is received within said housing, having appropriate contacts to which electrical conductors 16 are connected and extended therefrom. A float 17 is movably received within the chamber fitting 12 and has its rod 17' bearingly engaged with one end of the switch circuit closing arm whereby, with upward movement thereof, said arm will be contacted with an adjacent contact point of one of the conductors 16.

The pressure loss or reduction tell-tale means structurally embraces a pipe 18, valved as at 18', connected to and communicating with the uppermost nipple fitting 10 of the seal plate 9 and extending therefrom to a point within the manhole where its upwardly disposed free end mounts and communicates with a casing or housing 19 receiving and mounting a pressure actuated diaphragm 20. A rod 20' is connected to the diaphragm and to the circuit closing arm of an electrical switch 21 having electrical conductors 22 connected to and extended from the casing or housing.

In order that the degree of air or fluid pressure effected in the continuous and overall flow-way between the pipe 7 and jacket 6 will be constantly indicated, a suitable pressure gauge 23 is connected by a branch pipe 24 with the pipe 18.

To convey compressed air or other fluid to each of the sections or runs of jacketed piping extending from manhole to manhole of the system, i.e., the Circuits 1, 2, 3, 4 and 5, a main supply conduit 25 is disposed or extended longitudinally through and supported in the jackets 6 and manholes as shown in the FIGURE 5. Said conduit is connected to a compressor located within the power plant 2, or elsewhere, as conditions or preference may dictate. Branch conduits 25' are tapped into the main supply conduit within the manholes 5 and into the above-described branch pipes 24 and have valves 26 interposed therein. Thus, by opening the valves 18' and 26, compressed air or other fluid will be supplied to and within the jacket sections or runs via the branch pipes 24 and 18. When a desired pressure has been attained within the jackets and indicated by the gauges 23, the valves 26 will be closed; the valves 18' being left open, whereby the pressure loss or reduction tell-tale means within the casings or housings 19 will be, and will remain, operatively responsive.

The electrical conductors 16 and 22 provided to the hereinbefore described leakage and pressure loss tell-tale means are extended from a common source of electrical energy, not shown, preferably but not necessarily located within the power plant 2 and are individual to the aforesaid Circuits 1, 2, 3, 4 and 5. To protectively carry these conductors, a housing conduit 27 is supported within the jackets 6 and disposed longitudinally therethrough, as shown in the FIGURES 2, 3 and 5, receiving said conductors therethrough into junction boxes 28 where they are branched into electrical connection with their respective switches 15 and 21 through conduits 28'.

In the FIGURE 7 both of the manhole entered jacketed pipelines have been provided with leakage and pressure loss or reduction tell-tale means, such as hereinbefore described in detail. Angular drain pipes 29 are tapped into the lower portions of the jackets 6 with the remaining ends thereof connected to and communicating with float chamber fittings 30 fixedly supporting electrical switch housings 31 and mud or silt drains 32.

Casings or housings 33 receiving pressure actuated electrical switches, such as hereinbefore described and indicated by the numerals 20–21, are supported on and communicate with valved vertical pipes 34 carried by and communicating with the main compressed air supply pipe 25 and with valved branch air supply pipes 34' connected to the upper nipple fittings 10 of the end seal plates 9, while electrical conductors 35 extend from junction boxes 28 interposed in the housing conduit 27 through housing pipes 36 into said casings 33 and are connected to the switch terminals.

Air pressure gauges 37 are mounted on and communicate with the air supply pipes 34' and, obviously, serve to measure and constantly indicate the degree of air or fluid pressure within the overall flow-way between the pipes 7 and the jackets 6.

In FIGURE 8 I have illustrated a manhole 5 receiving the end of but one jacketed pipeline. The inner pipe end is, of course, closed in the usual manner, while the compressed air or fluid flow-way hereinbefore described, is closed by an end seal plate 9 equipped with nipple fittings 10, one of which is closed and the other, preferably the upper one, is connected to a valved air or fluid supply pipe 38 connected to a compressor or pump 39 within the manhole. Branch pipe extensions 40 and 40' extend from an appropriate portion of the supply pipe and mount and communicate with a pressure actuated electrical switch, generally indicated by the numeral 41, and with a pressure gauge 42.

A continual audible and visual electrical alarm 43 is suitably mounted within the manhole and connected via electrical conductors 44 with the contact terminals of the switch 41. Thus, it will be seen that in this particular adaptation of the invention, the components thereof are local to or contained within the manhole.

A further modification of the manhole or station for the leakage and pressure loss or reduction detecting and tell-tale means of the invention is shown in FIGURE 9 of the drawings. Herein, a tank-like receptacle 45 provided with a laterally disposed fixedly supported jacketed pipe receiving tubular extension 46, is sunk flush into and with the earth surface. Its top is open and normally closed by a cover 47 bolted or otherwise secured. An end of the jacketed piping is received in the extension 46. The heretofore described flow-way between the casing or jacket and the inner pipe is closed by a seal plate 9 equipped with a nipple fitting 48 to which an inwardly extending leakage drain pipe 49, plug closed at its end, is connected and discharges into said receptacle. A second and angularly formed drain pipe 49′ is tapped into the lower side or bottom of the pipe jacket and connected to a float chamber fitting 12 of the aforesaid leakage tell-tale means.

A pressure loss or reduction tell-tale means 19′, as hereinbefore described (FIGURES 5, 7 and 8) is mounted on and communicates with the free and upper end of the pipe 50, valved as at 51, an intermediate portion of which has a branch pipe 52 tapped thereinto and connected to a pressure gauge 53. Said pipe 50 is connected to and communicates with the main compressed air supply pipe 25 within the jacket 6.

Electrical conductors, not shown, connected to the contact terminals of the electrical switches of the leakage and pressure loss or reduction tell-tale means, respectively, are received in and through housing pipes 54 and 54′ and connected to the housing conduit 27 within the jacket 6 longitudinally of the aforesaid flow-way.

In order that leakage into the casings or jackets 6 of the Circuits 1, 2, 3, 4 and/or 5, and/or loss of air or fluid pressure therein will be selectively signaled to a watch attendant in the central power plant 2 or other remote control point, an alarm or signal panel is therein or there located, generally comprising a board 55 (FIGURE 4) on which sets of electrical, audible and visual signals, individually indicated by the reference numeral 56, are mounted and, of course, supplied with electrical energy from a suitable source (not shown), through a switch controlled power line 57. The number of these sets of signals will correspond to the number of piping system lines or circuits which they will individually serve and monitor, i.e., five pipeline circuits, as shown in FIGURE 1 of the drawings, and five individual signal sets therefor; said sets being appropriately identified to correspond to or with their respective circuits, as indicated at 58. Electrical conductors from the signal sets 56 are carried or extended from the signal panel through suitable cables 59 into and through the hereinbefore described and interconnected housing conduits 27 to their respective electrical conductors 16, 22 and 35 (FIGURES 1, 5, 7 and 9). Hence, as and when the leakage and/or pressure reduction or loss electrical switches of the pipeline Circuits 1 through 5 occurs, the corresponding signal sets 56 on the alarm and signal panel will be operated, thereby informing the watch attendant not only of the abnormal existing difficulty, but its location in the system, thereby expediting and facilitating its correction or remedying.

Whereas I have in the preceding description of my invention described the main supply compressed air conduits or pipes and the electrical wiring conduits or pipes as being received and supported within the casings or jackets 6 of the piping sections or circuits, it will be understood that both or either may be installed without the same; also that fluids other than air may be employed as pressure providing mediums. Furthermore, it is definitely within the purview or province of the invention to create a vacuum or partial vacuum, by the use of vacuum pumps, within the aforesaid flow-way between and extending throughout the lengths of the interconnected jacketed piping sections—this in lieu of a fluid pressure medium.

By the same token, in those instances where matter or matters flowed through the inner pipe or pipes must be maintained at predetermined temperatures, either hot or cold, thermostatically actuated electric switches may be installed in the jacketed pipe circuits or sections of the system with individual tell-tale signals therefor at or on the control panel board or in the system manholes, as conditions or preference may dictate.

I claim:

1. In combination with a jacketed piping system including lengths of interconnected tubular casings and inner pipes supported therein extending throughout the same in spaced relation to the walls thereof whereby to form a continuous flow-way therethroughout, certain of which casings and inner pipes are entered into relatively spaced manholes, an alarm system for signalling defects and deficiencies occurring in the casings and pipes, comprising:
    (a) Means for introducing and maintaining a supply of compressed fluid into and in the continuous flow-way;
    (b) A fluid pressure responsive and actuated electrical switch within each manhole communicating with said flow-way;
    (c) A float actuated electrical switch within each manhole communicating with said flow-way;
    (d) Central electrical signalling means remote from the jacketed piping system individually electrically connected to the pressure responsive and float actuated electrical switches in each said manhole selectively operable thereby; and,
    (e) Fluid pressure responsive and actuated gauges in the manholes communicating with said flow-way.

2. In combination with a jacketed piping system including lengths of interconnected tubular casings and inner pipes, movably supported therein, extending throughout the same in spaced relation to the walls thereof whereby to form a continuous flow-way therethroughout, certain of which casings and pipes are entered into relatively spaced manholes, an alarm system for locating and signalling defects and deficiencies occurring in the casings and pipes disposed between the manholes, comprising:
    (a) Means for introducing and maintaining a supply of compressed fluid into and in the continuous flow-way;
    (b) A fluid pressure responsive and actuated electrical switch within each manhole communicating with the flow-way between the casing and pipes entered into each said manhole;
    (c) A float actuated electrical switch within each manhole communicating with the flow-way between the casing and pipe entered into each said manhole;
    (d) A central electrical audible and visual signalling means remote from the jacketed piping system individually electrically connected to the pressure responsive and float actuated electrical switches in each said manhole selectively operable thereby; and,
    (e) Fluid pressure gauges in the manholes communicating with said flow-ways.

3. A piping system, comprising in combination:
    (a) a piping system including lengths of coaxially arranged and disposed tubular casings the opposed ends of which are spaced with relation to each other;
    (b) continuous piping received and supported in the casings extending throughout their collective lengths in spaced relation to the walls thereof forming flow-ways throughout the same;
    (c) means engaged in and at the spaced ends of lengths of the casings and with adjacent portions of said piping closing said flow-ways dividing the system into block-like divisions;
    (d) means communicating with the flow-ways of said divisions for supplying compressed fluid to and throughout the same;
    (e) fluid pressure responsive and actuated electrical switches connected to and communicating with the flow-ways of said divisions;
    (f) drains connected to and communicating with the lower portions of the flow-ways of the divisions;
    (g) liquid actuated electrical switches connected to and communicating with said drains, and,
    (h) central electrical signalling means remote from the piping system individually connected to the fluid pressure and liquid actuated switches selectively operable thereby.

4. A piping system, comprising in combination:
    (a) a piping system including lengths of coaxially arranged and disposed tubular casings the opposed ends of which are spaced with relation to each other;

(b) continuous piping received and supported in the casings extending throughout their collective lengths in spaced relation to the walls thereof forming flow-ways throughout the same;

(c) means engaged in and at the spaced ends of lengths of the casings and with adjacent portions of said piping closing said flow-ways dividing the system into block-like divisions;

(d) means communicating with the flow-ways of said divisions for supplying compressed fluid to and throughout the same;

(e) fluid pressure responsive and actuated electrical switches connected to and communicating with the flow-ways of said divisions;

(f) drains connected to and communicating with the lower portions of the flow-ways of the divisions;

(g) liquid actuated electrical switches connected to and communicating with said drains, and (h) audible and visual alarm means remote from the piping system individually connected to the fluid pressure and liquid actuated switches of each of said block-like divisions and selectively operable thereby.

References Cited

UNITED STATES PATENTS

| | | | |
|---|---|---|---|
| 337,116 | 3/1886 | Bauman | 340—242 |
| 2,050,521 | 8/1936 | Chapin | 340—242 X |
| 2,438,441 | 3/1948 | Hollingsworth | 340—242 X |
| 3,184,958 | 5/1965 | Eaton | 340—242 X |

NEIL C. READ, *Primary Examiner.*

D. MYER, *Assistant Examiner.*